United States Patent [19]

Batterman

[11] Patent Number: 4,553,042
[45] Date of Patent: Nov. 12, 1985

[54] SIGNAL TRANSITION ENHANCEMENT CIRCUIT

[75] Inventor: Eric P. Batterman, No. Brunswick, N.J.

[73] Assignee: RCA Corporation, Princeton, N.J.

[21] Appl. No.: 646,032

[22] Filed: Aug. 30, 1984

Related U.S. Application Data

[63] Continuation-in-part of Ser. No. 517,833, Jul. 27, 1983.

[51] Int. Cl.$^4$ .................. H03K 5/12; H03K 6/04; H03K 5/153
[52] U.S. Cl. .................. 307/263; 307/517; 307/518; 364/481
[58] Field of Search ............... 307/517, 263, 268, 358, 307/360, 361; 364/481, 724; 358/37; 333/138, 139; 328/55, 56, 152, 153, 154

[56] References Cited

U.S. PATENT DOCUMENTS

| | | | |
|---|---|---|---|
| 3,778,543 | 12/1973 | Lowry | 178/5.4 R |
| 4,050,084 | 9/1977 | Rossi | 358/31 |
| 4,223,342 | 9/1980 | Tsuchiya et al. | 358/37 |
| 4,241,310 | 12/1980 | Kerr | 328/119 |
| 4,280,133 | 7/1981 | Kato | 358/8 |
| 4,281,347 | 7/1981 | Tschannen | 358/166 |
| 4,288,872 | 9/1981 | Tamburelli | 375/14 |
| 4,307,413 | 12/1981 | Takeuchi et al. | 358/31 |
| 4,334,237 | 6/1982 | Reitmeier et al. | 358/36 |
| 4,334,244 | 6/1982 | Chan et al. | 358/166 |
| 4,352,162 | 9/1982 | Nyuji et al. | 364/724 |
| 4,355,326 | 10/1982 | Lee | 358/37 |

FOREIGN PATENT DOCUMENTS

2939578 4/1981 Fed. Rep. of Germany .
2087191A 5/1982 United Kingdom .

OTHER PUBLICATIONS

J. Rossi, "Digital Television Image Enhancement", *Journal of the SMPTE*, vol. 84, Jul. 1975, pp. 545–551.
Y. Faroudja et al., "Digital and Analog Enhancement Techniques", *SMPTE Journal*, vol. 87, Jan. 1978, pp. 24–28.

*Primary Examiner*—John S. Heyman
*Assistant Examiner*—K. Ohralik
*Attorney, Agent, or Firm*—Eugene M. Whitacre; Paul J. Rasmussen; Eric P. Herrmann

[57] ABSTRACT

A signal transition enhancement circuit detects transitions in the magnitudes of successive sampled data signals and substitutes certain data samples preceeding and following the transition for certain other data samples within the transition, thereby to decrease the number of data samples required to complete the transition. As a result, the rise and fall times of signals developed in response to the sampled data signals will be reduced. A transition is detected when respective sampled data signal magnitudes within two groups of successive samples are respectively relatively close in magnitude and the magnitudes of two selected signal samples differ by at least a predetermined amount.

20 Claims, 8 Drawing Figures

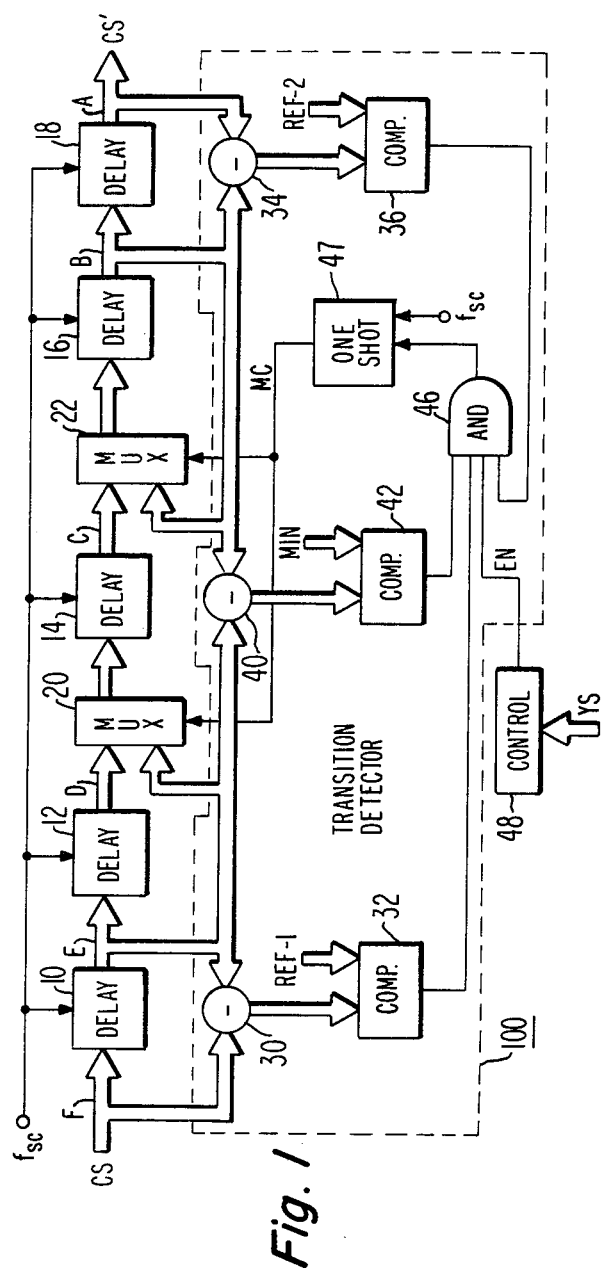
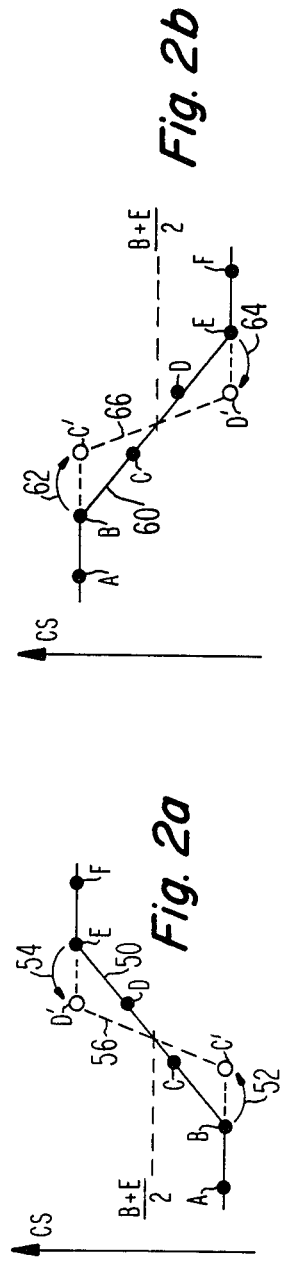
Fig. 1
Fig. 2a
Fig. 2b

SIGNAL TRANSITION ENHANCEMENT CIRCUIT

This is a continuation-in-part of application Ser. No. 06/517,833, filed July 27, 1983.

The present invention relates to signal processing circuitry and, in particular, to circuitry for enhancing the rise and fall times of signal transitions.

When signals are processed through systems having limited bandwidth or slew rate, the rise and fall times of transitions between signal levels is correspondingly limited. I.e., lower bandwidth produces more gradual transitions. In a television (TV) system, for example, the bandwidth of the chrominance signals is limited by the transmission system standard. In the NTSC system, the I chrominance component signal has 1.5 MegaHertz (MHz) bandwidth and Q chrominance component signal has 0.5 MHz bandwidth. Not infrequently, TV receiver circuitry processes both I and Q chrominance component signals with 0.5 MHz bandwidth.

For most picture conditions, the chrominance signal processing described above is satisfactory, even though it is desirable that the rise and fall times be improved. However, limited chrominance signal rise and fall times tend to make the edges of objects less well defined and to suffer from poor color fidelity. These undesirable picture effects are particularly evident when the object has a well-defined edge which the high bandwidth (4.2 MHz, luminance signal can reproduce but which the lower bandwidth chrominance signals cannot, and further when the color of the object is substantially different from that of the background.

Thus, there is a need for circuitry which will enhance (e.g., decrease) signal rise and fall times when certain transitions occur and for detectors of such transitions. It is noted that conventional peaking circuits which emphasize the higher frequency components of a signal relative to the lower frequency components thereof are of limited effect where the higher frequency components have been severely attenuated due to restricted signal bandwidth.

Accordingly, the signal processing circuit of the present invention comprises a plurality of cascaded delaying devices successively delaying input signals, a detector of magnitude transitions of the input signals, and selective couplings between inputs of ones of the delaying devices responsive to the detector.

In the drawing:

FIG. 1 is a schematic diagram in block diagram form of apparatus including an embodiment of the present invention;

FIGS. 2a and 2b are diagrams illustrating signals in the apparatus of FIG. 1.

Figure 3:
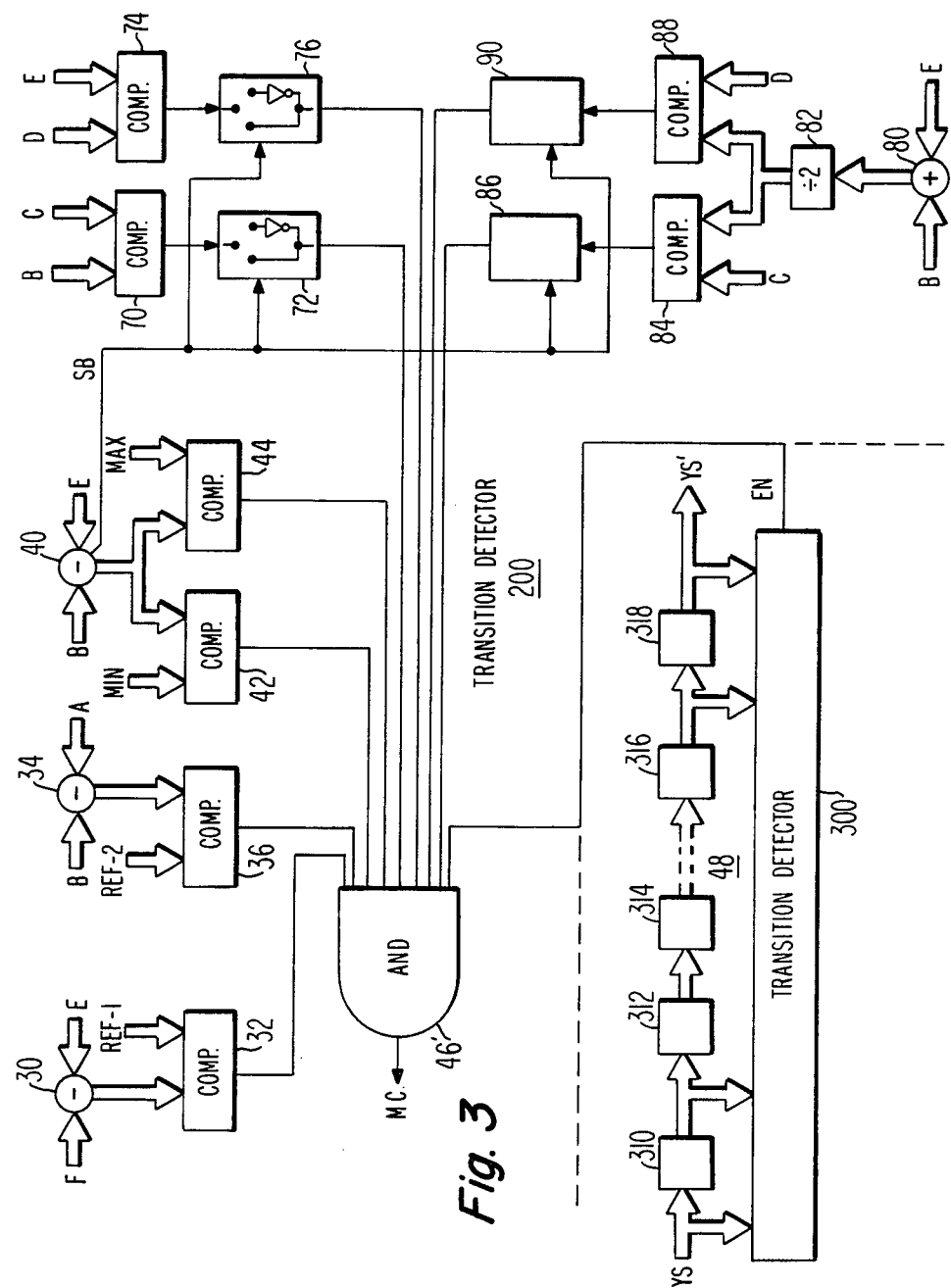
FIGS. 3-7 are schematic diagrams of modifications to, and alternate embodiments of, portions of the apparatus of FIG. 1.

Although the signals in the following description are referred to as digital signals, it is understood that the present invention is satisfactorily practiced with many different types of signals, for example, sampled data signals of both analog and digital types, and analog signals. In the drawing, broad arrows illustrate signal paths for multi-bit, parallel digital signals whereas line arrows illustrate signal paths for single-bit or serial digital signals, or for analog signals.

FIG. 1 illustrates a signal transition enhancement circuit including a transition detector adapted for processing digital chrominance signals in a television receiver having digital signal processing circuitry producing digital chrominance signals CS and for further processing of digital chrominance signals CS'.

In the following description, the operation of delay stages 10, 12, 14, 16 and 18 and of MUX's 20 and 22 to effect enhancement of rise and fall time is described first, and the operation of transition detector 100 is described thereafter.

Assuming initially that multiplexers (MUX) 20 and 22 couple signals at locations D and C to their respective outputs, input signals CS are successively delayed by cascade-coupled delay stages 10, 12, 14, 16 and 18 so that output signals CS' are simply input signals CS delayed in time. Each of delay stages 10, 12, 14, 16 and 18 is, for example, an eight-bit parallel latch responsive to a clocking signal $f_{sc}$. Clocking signal $f_{sc}$ has a repetition rate related to the color subcarrier frequency, i.e., about 3.58 MHz in the NTSC TV system. Thus, CS' is delayed in time from CS by five cycles of clocking signal $f_{sc}$.

When transitions of signals CS occur which satisfy certain predetermined criteria of magnitude and rise or fall time, transition detector 100 develops and applies control signal MC to MUXs 20 and 22 so that MUXs 20 and 22 selectively couple inputs of ones of the delay stage to inputs of others of the delay stages. Specifically, MUX 20 couples the input of delay stage 12 to the input of delay stage 14 and uncouples the output of delay stage 12 therefrom, and MUX 22 couples the input of delay stage 18 to the input of delay stage 16 and uncouples the output of delay stage 14 therefrom. Consider, for example, the time sequence of samples A, B, C, D, E, F of signal CS shown in FIGS. 2a as forming a transition from a lower magnitude to a higher magnitude (positive-going transition). The time represented by FIG. 2a is that in which the time sequence of samples of CS have been clocked through delay stages 10, 12, 14, 16 and 18 so that the sample-designating letters in FIG. 2a correspond to the signal-path-designating letters in FIG. 1. That is, signal CS is at this time at the magnitude indicated by sample F and was at the magnitude indicated by sample A five cycles of clocking signal $f_{sc}$ previously. Solid line 50 connects the samples A-F so as to illustrate the rise time of the transition represented by the samples A-F.

Consider further that at this time this sequence or samples have magnitudes such that detector 100 develops control signal MC activating MUXs 20 and 22 as described above. Then MUX 20 substitutes sample E for sample D at the input to delay stage 14 and MUX 22 substitutes sample B for sample C at the input to delay stage 16. These substitutions are respectively indicated by arrows 54 and 52 and the substituted samples E and B are respectively designated as D' and C' in FIG. 2a. At the next occurring cycle of clocking signal $f_{sc}$, the samples B, C', D', E, F are respectively latched in delays 18, 16, 14, 12 and 10, and detector 100 removes control signal MC because the transition detection criteria are no longer satisfied. In response to further cycles of $f_{sc}$, signal CS' will include the modified sequence of samples A, B, C', E, F (i.e. the magnitudes A, B, B, E, E, F in sequence) which has a transition having enhanced (decreased) rise time. Phantom line 56 connects the samples in the modified sequence so as to illustrate the enhanced rise time of the transition represented thereby.

By way of further example, consider the sequence of samples of signal CS shown in FIG. 2b as forming a transition from a higher magnitude to a lower magnitude (negative-going transition), illustrated by line 60. In accordance with the operation described above in relation to FIG. 2a, substitutions 62 and 64 are made by MUXs 20 and 22, respectively, in response to control signal MC so that the modified sequence, A, B, B, E, E, F of signal CS' representing an enhanced fall time, illustrated by phantom line 66, is produced.

Transition detector 100, and the predetermined criteria by which occurrence of a transition is detected, will now be described. A transition of a waveform is a change of instantaneous amplitude from one amplitude level to another amplitude level, and can be described in terms of the difference between the levels and the time required for the change of level. For sampled data, of which digital signals are an example, a transition can be described in terms of the magnitudes of samples or groups of samples, and the number of samples over which a magnitude change occurs.

Detector 100 detects a transition when the sampled data signal magnitudes are relatively close in magnitude for each of two groups of consecutive successive samples, and when the difference in magnitudes as between non-consecutive samples is substantial. Specifically, in a sequence of six consecutive successive samples, a transition is detected when (1) the first and second samples (first group of consecutive samples) are relatively close in magnitude to each other, (2) the fifth and sixth samples (second group of consecutive samples) are relatively close in magnitude to each other, and (3) when the magnitudes of the second and fifth samples (two non-consecutive samples) substantially differ from each other. These criteria establish that the first, second, fifth and sixth samples are not part of a transition, and that a substantial transition occurs between the two groups of samples, such as is illustrated by FIGS. 2a and 2b.

Transition detector 100 of FIG. 1 includes subtractor 30 which develops the difference between the magnitudes of consecutive samples E and F which is applied to comparator 32. Comparator 32 produces an output to apply an enabling level to one input of AND gate 46 when the difference $|E-F|$ is less than the relatively small value REF−1. Similarly, subtractor 34 develops the difference between consecutive samples A and B and comparator 36 applies an enabling level to a second input of AND gate 46 when the difference $|A-B|$ is less than the relatively small value REF−2. In addition, subtractor 40 develops from non-consecutive samples B and E the difference $|B-E|$ which, if it is greater than a substantial minimum value MIN, causes comparator 42 to apply an enabling level to a third input of AND gate 46. Assuming that enabling signal EN is present, coincidence at the inputs of AND gate 46 produces control signal MC to cause MUXS 20 and 22 to respectively apply sample E to the input of delay stage 14 and sample B to the input of delay stage 16 as described above. These criteria for detection of a transition are summarized in Table I.

TABLE I

| No. | Elements | Test Criteria at AND Gate 46 |
|---|---|---|
| 1. | 30, 32 | $|E - F| <$ REF-1 |
| 2. | 34, 36 | $|A - B| <$ REF-2 |
| 3. | 40, 42 | $|B - E| >$ MIN |
| 4. | 48 | EN = 1 |

Control device 48 develops enabling signal EN which enables and disables detector 100. Control device 48 is, for example, a transition detector developing enabling signal EN in response to transitions in luminance signal YS. It is noted that signals CS and YS are related in time because they are component signals representing the same picture. It is understood that control device 48 can be omitted.

Element 47 is a pulse generator or digital one-shot responsive to AND gate 46, and clock signal $f_{SC}$ to generate a pulse MC e.g., one sample period wide and which cannot output a subsequent pulse for, e.g. two sample periods. The width of the pulse provided by element 47 is dependent upon the number of sample periods that particular samples are to be translated. One-shot 47 precludes continuous recirculation of samples around the loop including multiplexer 22 and delay stage 16 which may occur with the transition detector merged into the transition enhancement circuit.

Note that element 47 is unnecessary when element 48 is employed or when the transition detector and the enhancement circuit operate with separate but parallel delay stages. Similarly element 47 may be eliminated with judicious choice of the comparator circuits or timing of the delay stages etc. Still further, element 47 may be eliminated when more samples are utilized in the detection process as for example in the detector of FIG. 3.

The loop including multiplexor 22 and delay stage 16 effectively provides an extended delay of particular samples. If the delay stage 16 is a one sample period delay element, multiplexor 22 may be eliminated and the function effectuated by selectively disabling the clock signal to delay stage 16 via the control signal MC.

Transition detector 200 shown in FIG. 3 is a modification of detector 100 in which additional detection criteria must be satisfied to produce control signal MC. The additional detection criteria ensure that the transition will only be enhanced if it is a relatively smooth and monotonic transition, thereby avoiding the loss of valid, relatively higher frequency sample information. This is achieved by additional detection criteria requiring that the transition magnitude difference between the second and fifth samples not exceed a maximum value, and that the magnitudes of the third and fourth samples are intermediate the average of the magnitudes of the second and fifth samples and the magnitudes of the second and fifth samples, respectively.

Detector 200 includes subtractors 30, 34 and 40, and comparators 32, 36 and 42 which correspond to like numbered elements of detector 100 described above. Comparator 44 applies an enabling level to an input of AND gate 46' when the difference $|B-E|$ developed by subtractor 40 is less than a maximum value MAX, which is itself greater than the minimum value MIN. Subtractor 40 also develops a sign bit SB which indicates whether the transition is positive- or negative-going and which is employed to simplify the comparator structure for testing the additional detection criteria.

Criteria indicating smoothness and monotonicity of a transition are tested by comparators 70, 74, 84 and 88 as follows. Comparator 70 compares samples B and C, the result of which comparison is selectively inverted by controllable inverted block 72 in response to sign bit SB. Thus, one input of AND gate 46' is enabled when the criterion B<C is satisfied for positive-going transitions and when the criterion B<C is satisfied for negative-going transitions. Similarly, comparator 74 and controllable inverter block 76 enable one input of AND gate 46' when the criterion D<E is satisfied for positive-going transitions and when the criterion D<E is satisfied for negative-going transitions. This ensures that the magnitudes of samples C and D are intermediate those of samples B and E providing a first indication of monotonicity.

Adder circuit 80 and divide-by-two circuit 82 develop the average of the magnitudes of samples B and E, which average is indicated by the phantom lines at level (B+E)/2 in FIGS. 2a and 2b. For sampled analog signals, circuits 80 and 82 are a resistive network; for digital signals, circuit 80 is an adder and circuit 82 is a bit shifter implemented by wired connections. Comparator 84 and controllable inverter block 86 enable an input of AND gate 46' when the criterion $C<\frac{1}{2}|B+E|$ is satisfied for positive-going transition and when $C>\frac{1}{2}|B+E|$ is satisfied for negative-going transitions. Similarly, comparator 88 and controllable inverter block 90 enable an input of AND gate 46' when the criterion $D>\frac{1}{2}|B+E|$ is satisfied for positive-going transitions and when $D<\frac{1}{2}|B+E|$ is satisfied for negative-going transitions. This ensures that the magnitude of sample C is intermediate the average level of B and E and the magnitude of sample B, and that the magnitude of sample D is intermediate the average level and the magnitude of sample E, thereby providing a further indication of monotonicity.

AND gate 46' develops control signal MC in response to coincidence of signals at all of its inputs. These criteria for detection are summarized in Table II.

TABLE II

| No. | Elements | Test Criteria at AND Gate 46' | |
|---|---|---|---|
| | | Positive-Going Transition | Negative-Going Transition |
| 1. | 30, 32 | $|E - F| <$ REF-1 | $|E - F| <$ REF-1 |
| 2. | 34, 36 | $|A - B| <$ REF-2 | $|A - B| <$ REF-2 |
| 3. | 40, 42 | $|B - E| >$ MIN | $|B - E| >$ MIN |
| 4. | 40, 44 | $|B - E| <$ MAX | $|B - E| <$ MAX |
| 5. | 70, 72 | $B < C$ | $B > C$ |
| 6. | 74, 76 | $D < E$ | $D > E$ |
| 7. | 80, 82, 84, 86 | $C < \frac{1}{2} |E + B|$ | $C > \frac{1}{2} |B + E|$ |
| 8. | 80, 82, 88, 90 | $D > \frac{1}{2} |E + B|$ | $D < \frac{1}{2} |B + E|$ |
| 9. | 48 | EN = 1 | EN = 1 |

For an eight-bit digital chrominance signal having values corresponding to the decimal values zero through 255, the following nominal comparison levels are satisfactory: REF−1=8, REF−2=8, MIN=48, MAX=255.

The remaining portion of FIG. 3 shows control circuit 48 comprising a luminance signal transition detection system. Luminance signals YS are successively delayed by delaying stages 310, 312, 314, 316 and 318 and are applied to transition detector 300. Detector 300 is, for example, of like structure to that of either detectors 100 or 200 as described above except that the control signal therefrom is applied to AND gate 46' as enabling signal EN. It is noted that delaying stages 310-318 may be a delay line existing as part of an FIR or comb filter within the luminance processing circuitry.

Figure 4:
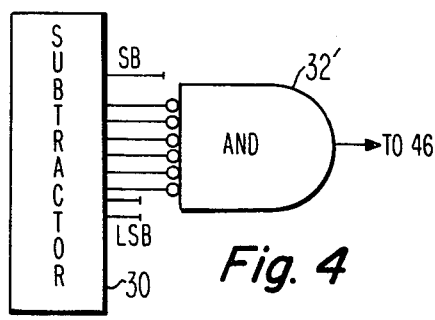
Figure 5:
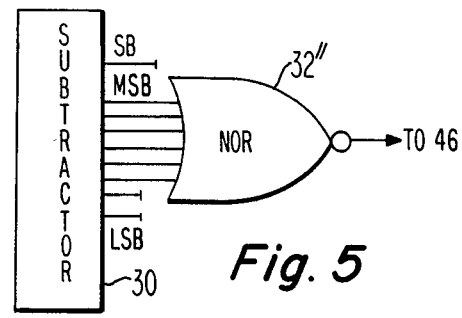

FIGS. 4 and 5 show embodiments useful, for example, as a substitute for comparators 32, 36 or 44 of FIGS. 1 and 2. AND gate 32' of FIG. 4 responds to coincidence of a selected number of the more significant bits (MBS) of the difference produced by subtractor 30 to apply an enabling level to AND gate 46 or 46'. NOR gate 32" of FIG. 4 responds to a selected number of the MSBs of the difference produced by subtractor 30 to apply an enabling level to AND gate 46 or 46'. The level of reference level REF−1 provided by gate 32' or 32" is given by $[2^N - 1]$ where N is the number of lesser significant bits (LSB) not connnected thereto and is listed in Table III.

TABLE III

| AND Gate 32' and NOR Gate 32": | | |
|---|---|---|
| MSBs Applied | LSBs Not Applied | Value of REF-1 |
| 8 | 0 | 0 |
| 7 | 1 | 1 |
| 6 | 2 | 3 |
| 5 | 3 | 7 |
| 4 | 4 | 15 |
| 3 | 5 | 31 |
| 2 | 6 | 63 |
| 1 | 7 | 127 |

Figure 6:
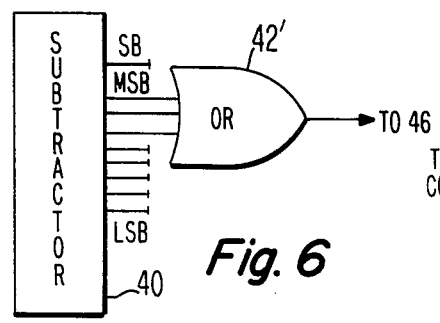

FIG. 6 shows an embodiment useful, for example, as a substitute for comparator 42 of FIG. 2. OR gate 42' responds to any one of the MBSs of the difference produced by subtractor 40 to apply an enabling level to AND gate 46'. The level or reference MIN is given by $[2^N - 1]$ where N is the number of LSBs not connected to OR gate 42'.

Figure 7:
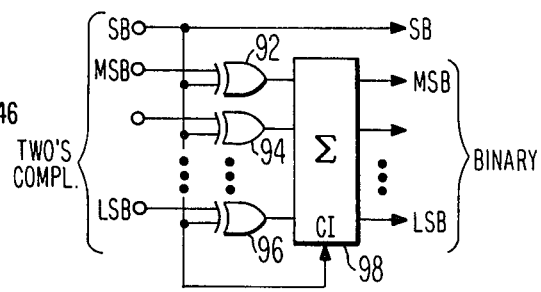

Modifications are contemplated within the scope of the present invention set forth in the claims following. For example, subtractor 80, divide circuit 82, comparator 88 and inverter block 90 of FIG. 2 can be eliminated and samples C and D applied directly to comparator 84. This provides a monotonicity indication where the criterion $C<D$ is satisfied for positive-going transitions and when $C>D$ is satisfied for negative-going transitions. Further, the comparator arrangements of FIGS. 4, 5 and 7 illustrate that the absolute value of the difference magnitude is obtained for signed-binary digital number signals by excluding the sign bit SB from the comparison.

It will be appreciated that the number of delaying stages 10, 12, 14 . . . employed, the repetition rate of clocking signal $f_{sc}$, the ones of the successively delayed samples of signals CS applied to detectors 100 and 200, and the location of MUXs 20 and 22 in the cascade of delaying stages all influence the rise and fall time detection limits and the degree to which the rise and fall times are enhanced. For example, to enhance the transitions of luminance signal samples produced at four times the color subcarrier frequency (i.e. $4f_{sc} \approx 14.32$ MHz for the NTSC system), a greater number of delaying stages are required. Moreover, the numbers of samples in the groups thereof can be greater of lesser than the two samples (A, B and E, F) described herein, and the number of samples between those groups can be greater or lesser than the two samples (C, D) described herein.

It will be further appreciated that transitions faster than those illustrated in FIGS. 2a and 2b can be enhanced so long as there is at least one signal sample within the transition. I.e, so long as the two samples compared to detect a transition are non-consecutive. For example, the circuit of FIG. 1 can be modified so that signal samples E and C are compared by subtractor 40 and comparator 42 to detect a transition in which case delay stages 12 and 14 and multiplexer 20 are the principal elements and only the substitutions 54 and 64 of FIGS. 2a and 2b are effected. Thus, MUX 22 can be eliminated and delay stage 14 coupled directly to delay stage 16.

While the transition enhancement described herein has referred to decreasing the rise and fall times of transitions, the present invention is also useful to increase rise and fall times. In this modification, MUX 20 is interposed before delay stage 12 and receives signal samples E and D at its inputs, MUX 22 is interposed before delay stage 18 and receives signal samples C and B at its inputs, delay stage 12 is coupled to delay stage 14, and delay stage 14 is coupled to delay stage 16. Thus, detector 100 produces control signal MC to cause sample C to be substituted for sample B and sample D to be substituted for sample E.

By way of further example, controllable inverter blocks 72, 76, 86 and 90 can be eliminated and multiplexers can be added to reverse the inputs to each of comparators 70, 74, 84 and 88. Still further, other digital number systems can be processed by the circuitry of the present invention by insertion of converters, such as the twos-complement-to-binary converter of FIG. 7, at appropriate locations within transition detectors 100 and 200.

What is claimed is:

1. A signal processing circuit comprising:
   an input for receiving input signals and an output at which output signals responsive to said input signals are produced;
   a plurality of delaying means coupled in cascade between said input and said output for successively delaying said input signals;
   detecting means, coupled to said plurality of delaying means and responsive to ones of said successively delayed input signals, for detecting a magnitude transition of said input signals; and
   means, coupled to said plurality of delaying means and to said detecting means, for selectively coupling an input of one of said delaying means to an input of another one of said delaying means in response to said detecting of said magnitude transition.

2. The circuit of claim 1 wherein said one of said delaying means is more proximate said input than is said other one of said delaying means.

3. The circuit of claim 1 wherein said one of said delaying means is more proximate said output than is said other one of said delaying means.

4. The circuit of claim 1 further comprising
   second means, coupled to said delaying means and to said detecting means, for selectively coupling an input of a second one of said delaying means to an input of a second other one of said delaying means in response to said detecting of said magnitude transition.

5. The circuit of claim 1 wherein said detecting means includes means for developing a detection signal of predetermined duration responsive to detecting said magnitude transition, said detection signal determining the duration of said selective coupling.

6. The circuit of claim 1 wherein said detecting means includes comparison means for detecting a magnitude difference between non-consecutive ones of said successively delayed input signals which exceeds a predetermined value.

7. The circuit of claim 6 wherein said detecting means further includes second comparison means for detecting a magnitude difference between further ones of said successively delayed input signals which is less than a second predetermined value.

8. The circuit of claim 1 further comprising control means for developing an enabling signal, and means for applying said enabling signal to said detecting means to enable said detecting of a magnitude transition.

9. The circuit of claim 8 wherein said control means develops said enabling signal in response to a transition of a second input signal which is related in time to said input signals received at said input.

10. The circuit of claim 9 wherein said input signals are representative of chrominance components of television signals and wherein said second input signals are representative of luminance components thereof.

11. A signal processing circuit comprising:
    first and second delaying means, having respective inputs and outputs, for respectively delaying signals applied to said inputs;
    multiplexing means, having a first input to which the output of said first delaying means is coupled, having a second input and having an output coupled to the input of said second delaying means, said multiplexing means for selectively coupling its first and second inputs to its output in response to a control signal;
    means for applying the same input signals to the input of said first delaying means and to the second input of said multiplexing means;
    detecting means for developing said control signal in response to a predetermined magnitude transition condition of said input signals and for applying said control signal to said multiplexing means to selectively interconnect the inputs of said first and second delay means.

12. The circuit of claim 11 wherein said detecting means comprises a comparing means for developing said control signal in response to the magnitude of said input signals changing in excess of a predetermined amount.

13. The circuit of claim 11 further comprising:
    third delaying means, having an input and an output, for delaying signals applied to its input;
    second multiplexing means, having a first input to which the output of said second delaying means is coupled, having a second input to which the output of said third delaying means is coupled, and having an output coupled to the input of said third delaying means, said multiplexing means for selectively coupling its first and second inputs to its output in response to said control signal.

14. The circuit of claim 13 wherein said detecting means comprises comparing means having a first input to which the input of one of said first, second and third delaying means is coupled, having a second input to which the output of one of said first, second and third delaying means is coupled, and having an output, for developing said control signal at its output in response to the magnitudes of signals at its first and second inputs differing by said predetermined amount.

15. The circuit of claim 11 further comprising:
    control means for developing an enabling signal, and means for applying said enabling signal to said detecting means to enable said detecting of a magnitude transition, wherein said control means develops said enabling signal in response to a transition of a second input signal which is related in time to said input signals received at said input.

16. A signal processing circuit comprising:
    an input for receiving input signals, and an output at which output signals responsive to said input signals are produced;

a plurality N of delaying means coupled in cascade between said input and said output for successively delaying samples of said input signals, wherein N is an integer;

first multiplexing means, interposed in said cascade coupling of said delaying means, having an output coupled to an input of a Jth one of said delaying means, and having first and second inputs respectively coupled to the outputs of a (J−1)th and a (J−R)th ones of said delaying means, where J is an integer no greater than N and R is a positive integer greater than 1 but less than (J−1), said first multiplexing means for selectively coupling its first and second inputs to its output in response to a control signal;

second multiplexing means, interposed in said cascade coupling of said delaying means, having an output coupled to the input of a Kth one of said delaying means, and having first and second inputs respectively coupled to the outputs of a (K−1)th and a (K+S)th ones of said delaying means, where K is an integer no greater than N and S is a positive integer less than (N−K+1), said second multiplexing means for selectively coupling its first and second inputs to its output in response to said control signal;

first detecting means, coupled to said delaying means and responsive to a first group of at least two consecutive input signal samples, for detecting that the magnitudes of said first group of consecutive input signal samples are within a predetermined range of relative magnitudes;

second detecting means, coupled to said delaying means and responsive to a second group of at least two other consecutive input signal samples, for detecting that the magnitudes of said second group of consecutive input samples are within a predetermined range of relative magnitudes;

third detecting means, coupled to said delaying means and responsive to two non-consecutive input signal samples, for detecting that the magnitudes of said two non-consecutive input signal samples differ by at least a predetermined amount; and means for developing said control signal in response to said detecting by said first, second and third detecting means and for applying said control signal to said first and second multiplexing means.

17. The circuit of claim 16 wherein said two non-consecutive samples include one sample from each of said first and second groups of consecutive samples.

18. The circuit of claim 16 further comprising control means for developing an enabling signal, and means for applying said enabling signal to said means for developing to enable said developing of said control signal.

19. The circuit of claim 18 wherein said control means develops said enabling signal in response to a transition of a second input signal which is related in time to said input signals received at said input.

20. The circuit of claim 19 wherein said input signals are representative of chrominance components of television signals and wherein said second input signals are representative of luminance components thereof.

* * * * *

UNITED STATES PATENT AND TRADEMARK OFFICE
CERTIFICATE OF CORRECTION

PATENT NO. : 4,553,042

DATED : Nov. 12, 1985

INVENTOR(S) : Eric P. Batterman

It is certified that error appears in the above-identified patent and that said Letters Patent is hereby corrected as shown below:

| | |
|---|---|
| Column 1, line 29 | after "MHz," insert --)--. |
| Column 2, line 46 | "or" should be --of--. |
| Column 2, line 61 | after "C'" insert --D'--. |
| Column 4, line 64 | "<" should be -->--. |
| Column 4, line 68 | "<" should be -->--. |

Signed and Sealed this

Sixth Day of May 1986

[SEAL]

Attest:

DONALD J. QUIGG

Attesting Officer

Commissioner of Patents and Trademarks